United States Patent [19]

Jensen

[11] 4,021,899
[45] May 10, 1977

[54] TIRE BUFFING MACHINE BLADES HAVING HEAT DISSIPATION MEANS

[75] Inventor: Wayne E. Jensen, Homewood, Ill.

[73] Assignee: B. & J. Manufacturing Company, Glenwood, Ill.

[22] Filed: Dec. 12, 1975

[21] Appl. No.: 640,201

[52] U.S. Cl. .............................. 29/79; 76/101 SM
[51] Int. Cl.² ................... B23D 71/00; B26D 1/00
[58] Field of Search .................. 29/79, 78, 106; 76/101 SM; 157/13; 51/266, DIG. 33; 83/835, 838, 839, 847

[56] References Cited

UNITED STATES PATENTS

| 182,178 | 9/1876 | Disston | 83/838 |
|---|---|---|---|
| 960,526 | 6/1910 | Erlandson | 29/106 |
| 3,145,511 | 8/1964 | Bird et al. | 51/266 X |
| 3,528,151 | 9/1970 | Walter | 29/78 |
| 3,879,825 | 4/1975 | Jensen et al. | 29/79 |

FOREIGN PATENTS OR APPLICATIONS

763,144 12/1956 United Kingdom ............... 29/106

Primary Examiner—Leonidas Vlachos
Attorney, Agent, or Firm—Johnson, Dienner, Emrich & Wagner

[57] ABSTRACT

Replaceable blades have an inner generally planar portion which is mounted between imperforate spacers of a tire buffing machine hub and an outer working edge portion which protrude beyond said spacers. Said working edge portion has spaced teeth and means in the form of apertures located adjacent the base of the teeth and outwardly of the perimeter of said spacers for collection and direction of air and/or externally applied moisture in rotation of the hub. In some of the disclosed forms the trailing edge of the apertures is embossed or otherwise scoop shaped for increased collection capability and/or capacity.

19 Claims, 27 Drawing Figures

TIRE BUFFING MACHINE BLADES HAVING HEAT DISSIPATION MEANS

This invention relates to an improvement in blades such as are removably mounted between the spacers and/or end plates of the rotating hub of a tire buffing machine.

Prior to the present invention, it was known to provide the blade mounting hubs of tire buffing machines with side vents through which air could be drawn into the hub interior, accelerated by fins or the like inside the hub and directed outwardly of the hub through provided slots in the spacers or hub parts between which the blades were mounted. Manufacturers of such hubs have urged that such circulation of air maintains lower hub and blade temperatures during the buffing action. Because the blades do not overheat and are kept below their annealing temperatures, blade wear is substantially reduced.

However, it has been found in practice that rubber dust which is a product of the buffing act tends to collect within the hub and, as it builds, the air passages and slots become clogged and their intended purpose is defeated. It also requires a special design of hub which increases manufacturing costs.

In accordance with the present invention, the outer working edge portion of the blades containing the teeth are provided with openings or apertures at the base of the teeth behind the leading edges thereof and outwardly of the perimeter of the hub parts between which the blades are assembled. These openings, particularly when the blades are disposed at a small angle to the direction of the hub rotation are effective to enforce air circulation about the teeth. These openings may take any one of several shapes and in a particularly useful form of the invention edge portions of the apertures are displaced or deformed to comprise integral embossments or scoop-shaped structures.

In a presently preferred form of the invention the openings are circular in shape and approximate the average width of the teeth. They are centered between the leading and trailing edges of the blade teeth and abut or protrude slightly above the tooth base line so that effectively the teeth are nearly completely surrounded by circulating air for a maximum cooling or heat dissipation effect. Because the apertures or openings are in the exposed portion of the blade outwardly of the hub periphery, they do not clog, and the air circulation which they enforce across and about the hub periphery and between the teeth tends to make the blade self-cleaning. Hubs equipped with such blades remain clean and relatively free of dust build-up in operation.

Also, as disclosed in my assignee's Jensen and Davison U.S. Pat. No. 3,614,973 it has been found advantageous to spray water onto the periphery of the blade teeth immediately ahead of its contact with the tire carcass to reduce smoke emission in the tire buffing action. In accordance with the present invention, the apertures or openings particularly when their trailing edges are embossed or scoop-shaped are effective to catch some of said spray to further dissipate heat generated in the teeth by their action on the tire.

The location of the apertures adjacent the base of the teeth, therebetween and the inner planar mounting portion of the blade which is sandwiched between the spacers and/or side plates of the hub means that the apertures are located in the strongest portion of the working edge portion and tooth strength is not sacrificed.

In a blade construction where the base of the teeth has substantial circumferential width, the apertures protrude partially into the base of the teeth between the leading and trailing edges of said teeth to maximize their cooling function.

Thus a feature of the invention is that the blades themselves contain means which enforce cooling and cleaning of the blades in operation of the buffing machines.

Ancillary thereto is the feature that no specific modification of a conventional hub is required —as long as the pin receiving holes of the blade mounting portion are so located that there is adequate radial protrusion of the working edge portion of the blades to accommodate exposure of the openings and/or apertures provided at the base of the teeth in accordance with this invention.

Thus a further feature of the invention is that while no modification of the hub is required, the invention is also applicable to blades of conventional design. The required modification of the blades is slight and does not complicate the blade manufacturing process. It can be accomplished simultaneously with and as a part of the stamping operation in which the teeth of the blades are formed from the raw sheet metal.

Thus, importantly the invention permits the claimed features of the recited prior hub constructions to be obtained at minimum cost and by simple manufacturing techniques. At the same time, the blades are so constructed as to efficiently and effectively clean hub periphery and the blade teeth as heat build-up in said teeth is dissipated.

Many other objects, advantages and/or features of the invention will be at once apparent or will become so from the detailed description of the invention as it is now contemplated which follows:

Referring therefore first to the drawings which illustrate the invention as applicable to tire buffing machine blades of several different tooth designs:

FIGS. 13 through 20 illustrates other shapes and dispositions of the air collection means comprising the invention;

FIG. 21 illustrates the invention embodied in a peeling blade such as disclosed in U.S. Pat. No. 3,618,187;

FIG. 22 illustrates the invention embodied in blades having a non-arcuate working portion, the blades being shown mounted between spacers in an assembly unit and FIG. 23 illustrates several such assembly units mounted on one side of a disc hub as disclosed in U.S. Pat. No. 3,879,825; and FIGS. 24 and 25 illustrate still another form of blade construction in which the invention is embodied, the blades being illustrated in place between the hub plates; and FIG. 25 being a view taken along line 25—25 of FIG. 24.

Figure 1:
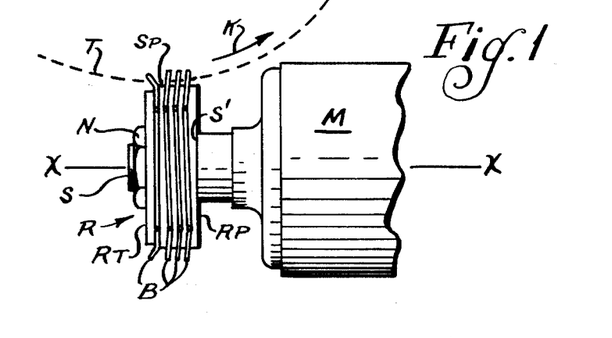
FIG. 1 is a schematic illustration of blades as they are commonly assembled between the side plates and spacers in the hub of a tire buffing machine.

Referring now more particularly to the several views wherein like parts are identified by like reference indicia, FIG. 1 illustrates at R the rotating hub of a conventional tire buffing machine into which blades in accordance with the present invention are mounted.

Such a hub R may be constructed as disclosed in U.S. Pat. No. 2,703,446 and conventionally embodies an outer plate RT and arear plate RP. Both said end plates are generally of the same circular shape and diameter, and each has a central opening through which is received the reduced end of shaft S of a motor M. In the illustrated form of hub, rear plate RP has regularly spaced pairs of axially directed pins P (FIGS. 3 & 4) and outer end plate RT has correspondingly located openings P' to receive said pins. Said pins P seve to removably hold annular rows of blades B and intervening spacers Sp in spaced concentric relation about axis x—x of the hub R and set at a small angle to the hub rotational plane indicated at y—y, so as in rotation to have a spiraling or oscillating effect. The teeth B in the outer interrupted working edge portion of the blades which extend beyond the hub periphery thus disposed are available for attack on the outer periphery of a tire Y for removal of tread therefrom as the tire T more slowly rotates on its support (not shown) in a direction indicated by arrow K relative to the exposed periheral edge of the blades B in the more rapidly rotating hub R. A nut N threadedly connected on the end of shaft S holds the hub assembly including blades, spacers and end plates firmly against Shoulder S'. In accordance with this invention the spacers Sp and end plates RT and RP advantageously may be imperforate except for pin mounting holes PO which are required to effect the hub assembly. The assembled hub therefore does not load with dust from the buffing operation.

Figures 2, 3, 5:
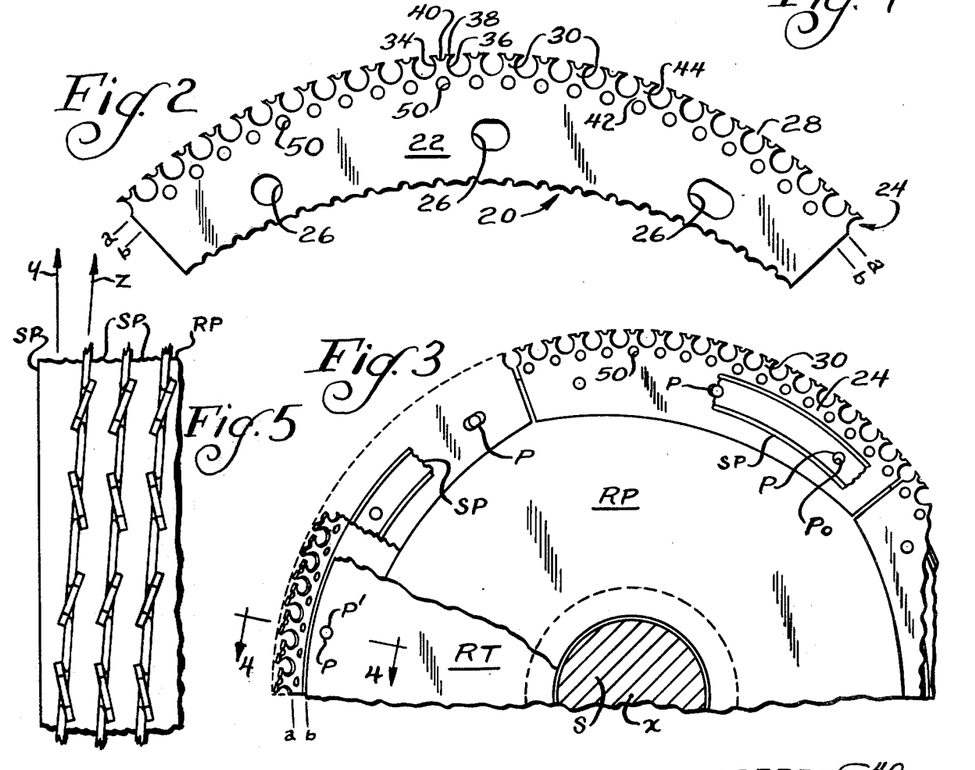
FIG. 2 is a plan view of a blade constructed in accordance with the invention; the illustrated blade being of the type disclosed by U.S. Pat. Nos. 2,896,309 and 3,082,506.
FIG. 3 is a partially fragmented plan view of the hub assembly of FIG. 1 showing an assembly of blades according to the invention arranged in rows between side plates and spacers, the blades illustrated in this view having a tooth structure as disclosed in the aforementioned patents.
FIG. 5 is a partially fragmented view of a hub and illustrates one disposition of the blades and setting of their teeth relative to the axis and direction of hub rotation.

FIG. 2 illustrates a blade B conventionally stamped or otherwise formed from sheet metal. As illustrated, blade B comprises a segment 20 of an annulus of predetermined angular extent wherefore four, five or other number of blades would be required if arranged end-to-end to complete a circle. Blades B may also comprise annuli or discs in which event the blades could also be inclined to axis y—y or parallel thereto. For other useful blade shapes to which the invention has application reference may be had to U.S. Pat. No. 3,879,825 and particularly its FIGS. 19–21, 24, 26–28, 31 and 35.

Figure 4:
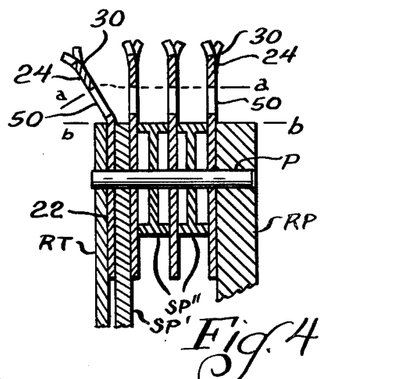
FIG. 4 is a fragmentary sectional view taken along lines 4—4 of FIG. 3.

Conventionally, blade segments 20, as illustrated in FIG. 2, comprise an inner main body portion 22 having generally flat parallel opposed surfaces and an outer convex-shaped working edge portion 24. The inner main body portion 22 of said blade segments 20 has spaced openings 26 by means of which it may be assembled on pins P between end plates RT and RP. The outer working edge portion 24 of said blade contains a plurality of circumferentially spaced openings or cut-outs 28 which interrupt the outer edge of the blade and divide it into a number of spaced spaced teeth 30. In FIGS. 1, 3 and 4, the working edge portion 24 of the first row of blades closest to end plate RT is shown inclined at an acute angle to its inner main body portion 22 in which disposition its teeth 30 perform a peeling function, whereas the working edge portion 24 of the blades in subsequent rows lie generally in the plane of their inner mounting portion and have a radial disposition as illustrated by FIG. 1 wherefore they perform a buffing function. Such an arrangement is more specifically described in assignee's U.S. Pat. No. 3,618,187. In some hub assemblies the first row of peeling blades is omitted.

As earlier mentioned, blades B are conventionally separated into annular rows by being sandwiched between spacers Sp (FIGS. 3 and 4). Spacers Sp like blades B are also provided with pairs of openings corresponding to the location and spacing of pins P. Spacers Sp also may comprise annuli or discs or annular segments. In FIG. 4 spacers Sp' is a disc and spacers Sp'' comprise an annular segment corresponding in angular extent to that of blades B and have a substantially I-beam shape in cross section. As described above, the hub assembly and the manner of assembling blades between the end plates and in rows sandwiched between spacers is merely exemplary of the hub structions conventionally available. However, in accordance with this invention, the exposed peripheral of asid spacers between the blades in imperforate. Also, as illustrated by FIG. 3 and particularly FIG. 4, pin openings 26 are spaced radially inwardly of the corresponding pin openings in spacers Sp a distance such that whereas the outer surface of spacers Sp lie flush with or slightly inward of the outer perimeter of the hub end plates RT and RP when assembled therewith, the working edge portion 24 of the blades extend outwardly of the spacers Sp such that the teeth 30 including their base line a—a lie wholly radially beyond the perimeter b—b of the hub spacers Sp.

Referring now more particularly to FIG. 2, there is illustrated one form of blade for mounting in a hub as thus far described. Such a blade has a tooth structure more completely described in the aforementioned U.S. Pat. Nos. 2,896,309 and 3,082,506 to which reference may be had and the description of which is intended to be included herein by reference thereto. For purpose of an understanding of this invention, it will be appreciated that such blades comprise a sheet metal member in the form of an annular segment 20 having the aforementioned inner generally planar mounting portion 22 and an outer working edge 24 comprising circumferentially spaced teeth 30. As aforementioned, the inner planar mounting portion 22 of such blades is provided with openings 26 to receive mounting pins P to permit assembly of the blades between spacers Sp and end plates RT and RP of the hub R as aforedescribed. In the embodiment according to FIG. 2, teeth 30 into which the outer edge of the outer working portion 24 is divided are generally dovetail in shape having semi-circular-shaped leading and trailing cutting edges 34,36 which intersect the outer tooth edge 38 at a sharply acute angle. The outer edge 38 of the teeth contain a semi-circular or vee-shaped notch 40 (or slit or slot) which extends to a depth usually less than half the radial height of the teeth. Whereas the leading edge of the teeth, by reason of their sharp inclination to the outer edge of the teeth, are set at a positive rake angle to maximize their cutting ability, the trailing edge of the notch or slit 40 is set so as to have a zero or negative rake in its attack on the tire T which imparts a finely buffed texture to the tire surface cleared by the cutting edge of the teeth. In other forms of blades as for example that disclosed in my assignee's W. E. Jensen application for Patent Ser. No. 640,041 filed concurrently herewith for Tire Rasp Blades with Renewable Cutting and Buffing Edges, the buffing edge forming slots or slits may extend to a radial depth greater than half the tooth radial height. As illustrated in FIG. 2, the teeth 30 are relatively broad at their outer tooth edge 38 and through the base 42 but narrower at their waist 44.

Figure 13:
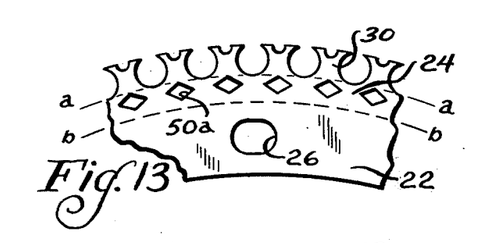
Figure 14:
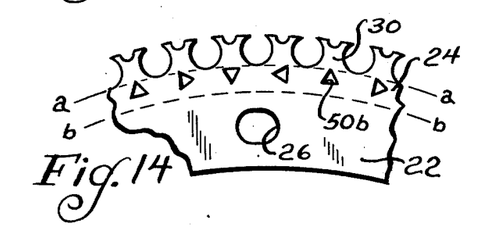
Figure 15:
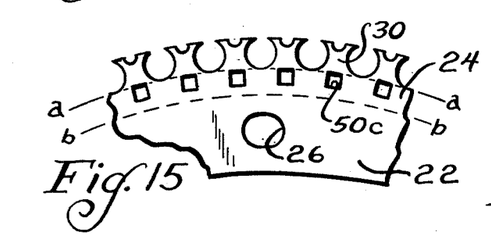
Figure 16:
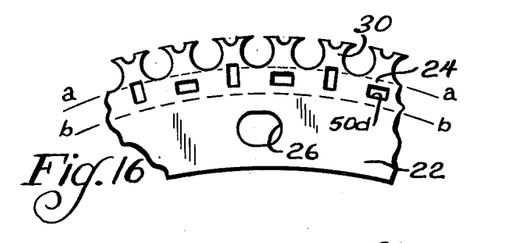
Figure 17:
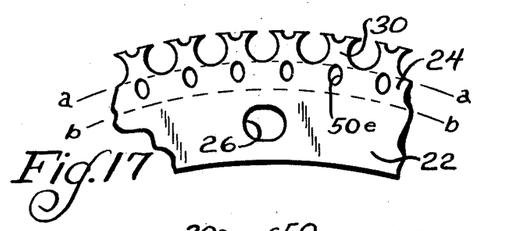
Figure 18:
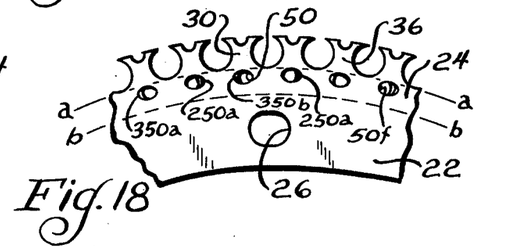

In accordance with this invention, a small opening or aperture 50 is provided in the working edge portion 24 of the blade immediately adjacent the base of a large number of the teeth 30 and preferably all of the teeth, said opening 50 being centered between the leading and trailing cutting edge 34,36 of said teeth. As illustrated by FIG. 2, said openings 50 are circular in shape although they may be of polygonal or other configuration. Thus FIG. 13 illustrates a blade in which such openings are indicated at 50a as diamond shaped. In FIG. 14 at 50b as triangular shape, in FIG. 15 at 50c as square shaped, and in FIG. 16 at 50d as rectangular shaped. In FIG. 16 every other opening 50d is illustrated as radially disposed and alternate openings as circumferentially disposed. However, all of the openings may be disposed in either of said directions. FIG. 17 illustrates openings 50e as oval shaped and vertically disposed. In FIG. 18 they are illustrated at 50f as horizontally disposed and in FIG. 19 at 50g as hexagonal shaped. Said openings 50–50g substantially abut the tooth base line a—a and preferably extend a partial distance into the base of the teeth. In FIG. 2 openings 50 are illustrated as having a diameter or cross section approximating the average width of the teeth. In FIG. 2 the diameter of circular openings 50 approximate the tooth waist 44. In those instances where the teeth are relatively broad at their base 42, the openings 50 advantageously can extend partially above the base line of said teeth to maximize their cooling effect. In other tooth shapes which do not have a broad base this may not be possible. Because of the circular shape of openings 50, said openings 50 can extend above said base line a—a and still leave web sections 48 at either side thereof without sacrifice of tooth strength. As a practical matter openings 50–50 g will have an areal size as large as possible and consistent with the tooth width. Thus in the exemplary blade of FIG. 2, openings 50 have a diameter of about 1/8 to 3/16 inches and the webs 48 on either side an average width approximating about one-half said diameter.

Figures 9, 9A:
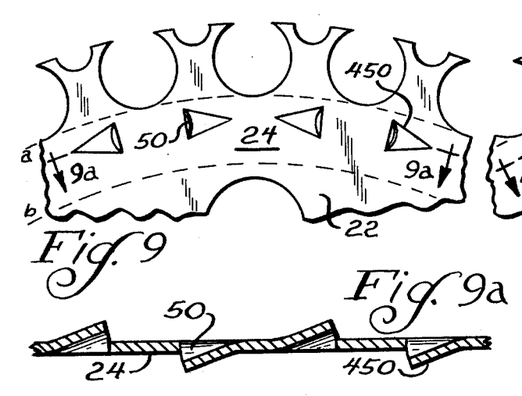
FIGS. 9 and 9a illustrates an embodiment of the invention where one edge of the air collection openings at the base of the teeth have associated scoop shapes to increase their air collection capacity, FIG. 9a being a sectional view taken along line 9—9 of FIG. 9.
Figures 10, 10A:
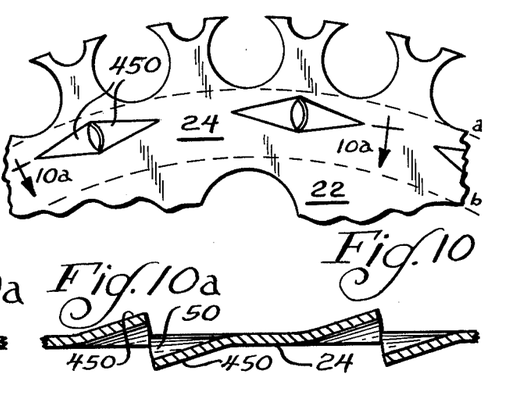
FIGS. 10 and 10a illustrate an embodiment of the invention wherein both the leading and trailing edge of the air collection openings are scoop-shaped.
Figures 11, 12:
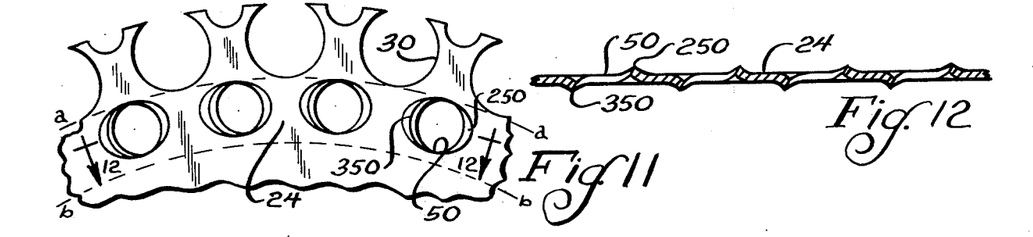
FIG. 11 illustrates a further embodiment of the invention wherein the leading and trailing edges of the air collection openings are oppositely embossed to improve their air collection capability.
FIG. 12 is a sectional view taken along line 12—12 of FIG. 11 to illustrate details of said embodiment.

By reason of the location of the openings 50 at the base of the teeth and immediately behind the cutting action of the leading edge of said teeth, such openings facilitate passage of cooling air in rotation of the hub R as well as collecting moisutre sprayed onto the teeth as aforementioned and thus are useful to dissipate heat generated in the cutting edges of the teeth as they attack the rubber surface of the tire in the operation of the buffing machine. It has been found that said air holes are particularly effective when the blades are set an an inclination z—z to axis y—y as illustrated in FIG. 4. Their effectiveness can be further increased by embossing at least the trailing edge threof as indicated at 250 in FIGS. 11 and 12. Embossing their leading edge 350 to the opposite said aids in direction the air flow and when both the leading and trailing edges are thus embossed the blades are reversible without loss of cooling function. FIG. 18 illustrates another arrangement wherein alternate teeth are oppositely embossed. Thus in said FIG. 18 embossments 250a are directed to one side of the blade and embossments 250b in intervening teeth to the opposite side. Similarly, s illustrated by FIGS. 9 and 10 the trailing edge of the air holes 50 may be conically flared to form an air scoop 450 which is particularly effective in collecting air as the hub is rotated and directing it across the teeth. As illustrated by FIG. 9a preferably alternate teeth are oppositely flared and so that the blades may be reversed without loss of cooling function. In an alternate form as illustrated by FIGS. 10 and 10a, both the leading and trailing edges of the apertures may be scoop-shaped, their displacements being to opposite sides of the blade.

Referring particularly to FIG. 3, the outer working edge portion 24 of the blades should have a radial dimension such that the inner terminus b—b thereof coincides with the outer periphery of the spacers Sp for full exposure of the air collection means 50–50g associated with the teeth 30. This is easily accomplished by appropriate location of the pin receiving holes 26 in the inner mounting portion 22 of the blades. It will be understood, of course, that opening 50 may be so located as to be partially covered by spaces Sp when assembled in hub R. In this event the openings are sufficiently large that an effective portion of the openings lies above b—b to be effective.

Figure 6:
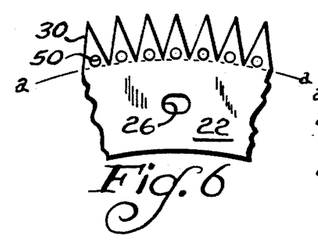
FIG. 6 through 8 illustrate the invention applied to blades having shapes of teeth other than the embodiment illustrated by FIGS. 2 and 3.
Figure 7:
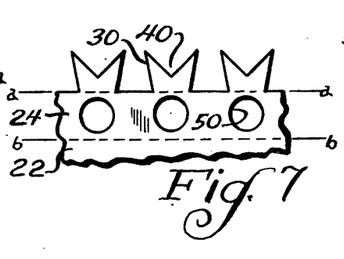
Figure 8:
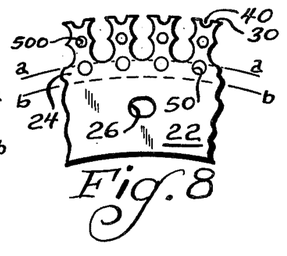
Figures 19, 20, 21, 22, 23, 24, 25:
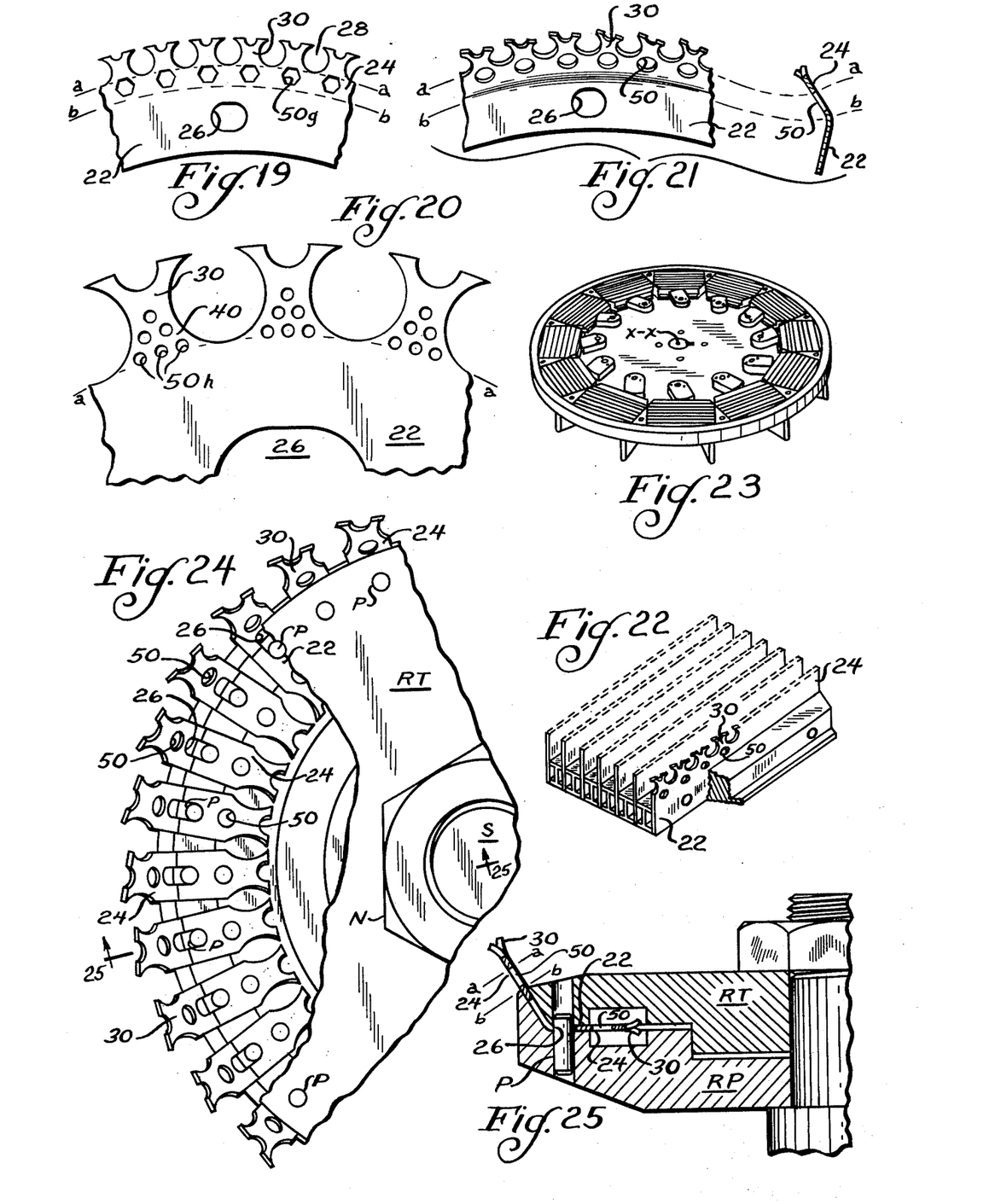

As aforementioned, collection means 50 will partially protrude into the base of the teeth if there is sufficient material at the base so that tooth strength is not sacrificed. Where the air collection openings 50 protrude into the tooth base, they are more proximate to the cutting edges of the teeth and wherefore their cooling funcion can be maximized. However, where the width of the tooth (FIG. 7) at its base will not permit substantial penetration of the opening 50 above the tooth base line a—a, the opening can be located immediately below the base line. Although it is presently preferred that an air collection openings 50 be aligned with each tooth, a lesser number of openings than teeth may be utilized. As illustrated by FIG. 20. the tooth cooling effect may be obtained by providing several small perforations 50h in the tooth base 42. In a shape of tooth as illustrated in FIG. 8 where the leading and trailing edges of the teeth comprise inner and outer intersecting circular portions, there may be sufficient tooth area at the waist 42 to permit location of a second altough smaller-diametered air collection opening 500. In a tooth shep such as illustrated by FIG. 6, it may be possible to locate the air collection opening 50 so as to protrude a substantial distance above the tooth base line a—a and/or fully within the base of the teeth without loss of tooth strength.

It should be understood that the blades illustrated and thus far discussed are merly exemplary of blades to which the present invention has application. For example, the invention also has application to blades having a non arcuate working edge portion as illustrated by FIGS. 22 and adapted for mounting on a disc hub in the manner illustrated by FIG. 23. The invention also has application to blades having a single tooth 30 as illustrated by FIGS. 24 and 25 or a tooth in which the tooth bearing portion is inclined to the body portion as illustrated by FIG. 22. For a more detailed description of the construction and mounting of such blades in the illustrated hubs, reference may be had to the aforementioned U.S. Pat. No. 3,879,825. It will also be understood that the construction of the spacers Sp and the hub R itself, as thus far described, are merely typical of buffing machine hubs as are conventionally available. It will be appreciated therefore that the invention is applicable to a wide variety of blades having different tooth shapes as well as different modes or means for mounting in the hub insofar as the working edge portion of the blades provides or may be made to have sufficient space outwardly of the hub periphery to accommodate the air collection means and without substantial reduction in tooth strength.

In a hub construction as illustrated by FIGS. 1, 3 and 4, where the end plates and spacers are imperforate, there is no problem of the hub interior loading with rubber dust from the abrading action of the blade teeth. At the same time the openings 50 because of their location at the base of the blade teeth and directly above the exposed imperforate smooth surface of the spacers Sp between the hub end plates are available for clearing rubber dust from the hub periphery and so that the same does not build up between the teeth.

From the aforesaid description of the embodiments of the invention it will be appreciated that all of the recited objects, advantages and features of the invention have been demonstrated as obtainable in a highly economical, practical and useful manner.

Thus having described the invention, I claim:

1. A replaceable blade for the rotating hub of a tire buffing machine comprising a sheet metal member having an outer working edge portion and an inner generally planar mounting portion by which the blade is removable fixed to the hub with its outer working edge portion protruding beyond the hub periphery, said working edge portion comprising spaced teeth having leading edges which attack the tire surface in rotation of the hub during operation of the buffing machine to remove material therefrom, said teeth having trailing edges therebehind, and the working edge portion further having openings extending transversely through the blade adjacent the base of the teeth intermediate their leading and trailing edges and outwardly of the inner planar mounting portion of the blade, said openings collecting air in rotation of the hub and enforcing its circulation immediately behind the cutting action of the teeth and across the hub periphery to dissipate heat as it is generated in the teeth and material build up on the hub periphery about the blade teeth in the buffing act.

2. A replaceable blade as claimed in claim 1 wherein the openings extend at least partially above the base line of the teeth.

3. A replaceable blade as claimed in claim 1 wherein at least the trailing edge of the openings is embossed.

4. A replaceable blade as claimed in claim 1 wherein both the leading and trailing edges of the openings are embossed, the embossments on one edge displaced to a side of the blade oppsite that to which the embossment of the other edge is displaced.

5. A replaceable blade as claimed in claim 1 wherein the openings have associated scoop-shaped portions.

6. A replaceable blade as claimed in claim 1 wherein the openings have at least their trailing edge displaced to one side of the blade working edge portion to catch and deflect fluid through the openings to the opposite side of said working edge portion.

7. A replaceable blade as claimed in claim 6 wherein said displaced trailing edge has a generally conical shape.

8. A replaceable blade as claimed in claim 6 wherein the trailing and leading edges of the openings are displaced to opposite sides of the blade working edge portion.

9. A replaceable blade as claimed in claim 8 wherein said displced trailing and leading edges of the openings have facing generally conical shapes.

10. A replaceable blade for the rotating hub of a tire buffing machine comprising a sheet metal member having an outer working edge portion and an inner generally planar mounting portion by which the blade is removably fixed to the hub with its outer working edge portion protruding beyond the hub periphery, said working edge portion comprising at least one tooth having a leading edge which attacks the tire surface in rotation of the hub during operation of the buffing machine to remove material therefrom, and a trailing edge therebehind, the working edge portion of said blade further having an opening extending transversely through the blade adjacent the base of said tooth intermediate its leading and trailing edges and outwardly of the inner planar mounting portion of the blade, said opening collecting air in rotation of the hub and enforcing its circulation immediately behind the cutting action of the tooth and across the hub periphery to dissipate heat as it is generated in the tooth and material build up on the hub periphery in the buffing act.

11. A replaceable blade as claimed in claim 10 wherein the air collection opening is circular and has a circumferential dimension approximating the average width of the tooth.

12. The blade of claim 10 wherein the outer working edge portion is inclined at an angle to the plane of the blade mounting portion.

13. The blade of claim 10 wherein the blade has a second working edge portion to the opposite side of said inner mounting portion.

14. The blade of claim 10 wherein the air collection opening is centered between the leading and trailing edges of the teeth and extends at least in part above the base line of the teeth.

15. The blade of claim 14 wherein the air collection opening is circular in section.

16. A replaceable blade for the rotating hub of a tire buffing machine embodying separable parts between which blades are mounted, the replaceable blade comprising a sheet metal member having an outer working edge portion and an inner generally planar mounting portion containing means by which the balde may be removably fixed between said hub parts with its outer working edge portion protruding outwardly of the hub, said protruding working edge portion comprising cutouts which interrupt the outer blade edge forming teeth therebetween having leading and trailing edges, and an air collection opening inwardly of said teeth between the base line thereof and the inner generally planar mounting portion of the blade, the air collection opening including an embossment on its trailing edge.

17. A replaceable blade for the rotating hub of a tire buffing machine embodying separable parts between which blades are mounted, the replaceable blade comprising a sheet metal member having an outer working edge portion and an inner generally planar mounting portion containing means by which the blade may be removably fixed between said hub parts with its outer working edge portion protruding outwardly of the hub, said protruding working edge portion comprising cutouts which interrupt the outer blade edge forming teeth therebetween having leading and trailing edges, and an air collection opening inwardly of said teeth between the base line thereof and the inner generally planar mounting portion of the blade, the leading and trailing edges of the air collection openings having oppositely disposed embossments.

18. A replaceable blade for the rotating hub of a tire buffing machine embodying separable parts between which blades are mounted, the replaceable blade comprising a sheet metal member having an outer working edge portion and an inner generally planar mounting portion containing means by which the blade may be removably fixed between said hub parts with its outer working edge portion protruding outwardly of the hub, said protruding working edge portion comprising cutouts which interrupt the outer blade edge forming teeth therebetween having leading and trailing edges, and an air collection opening inwardly of said teeth between the base line thereof and the inner generally planar mounting portion of the blade, at least the trailing edge of some of said openings having a scooplike formation displaced to one side of the working edge portion.

19. The blade of claim 1 wherein the teeth are wider at their base line and outer edge than through the waist, and the air opening is located immediately below said base line and has a diameter approximating the width of the teeth at their waist.

* * * * *

UNITED STATES PATENT OFFICE
CERTIFICATE OF CORRECTION

Patent No. 4,021,899      Dated May 10, 1977

Inventor(s) Wayne E. Jensen

It is certified that error appears in the above-identified patent and that said Letters Patent are hereby corrected as shown below:

Column 3, line 35,    Change "arear" to --a rear--;

line 51,    Change "Y" to --T--;

line 53,    Change "periheral" to --peripheral--;

Column 4, line 43,    Change "asid" to --said--;

Column 6, line 15,    Change "opposite said aids in direction" to --opposite side aids in directing--;

line 22,    Change "s" to --as--;

line 65,    Change "altough" to --although--;

line 67,    Change "shep" to --shape--;

UNITED STATES PATENT OFFICE
CERTIFICATE OF CORRECTION

Patent No. 4,021,899   Dated May 10, 1977

Inventor(s) Wayne E. Jensen

It is certified that error appears in the above-identified patent and that said Letters Patent are hereby corrected as shown below:

Column 7, line 49,   Change "removable" to --removably--;

Column 8, line 23,   Change "displced" to --displaced--.

Signed and Sealed this second Day of August 1977

[SEAL]

Attest:

RUTH C. MASON
*Attesting Officer*

C. MARSHALL DANN
*Commissioner of Patents and Trademarks*